J. W. MURRAY.
METHOD OF MAKING NUTS FOR BOLTS.
APPLICATION FILED JUNE 21, 1916.
1,223,604. Patented Apr. 24, 1917.
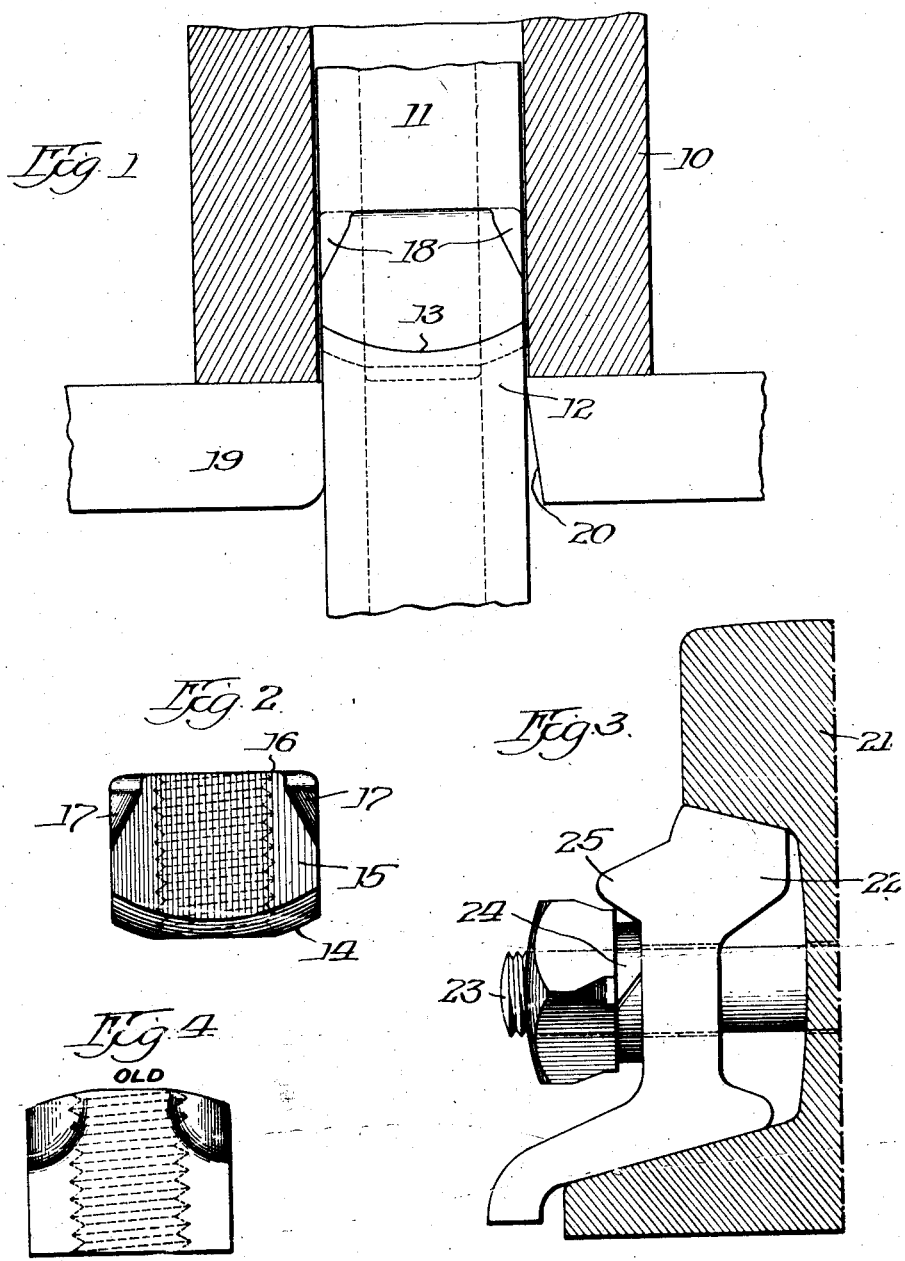

UNITED STATES PATENT OFFICE.

JOHN W. MURRAY, OF JOLIET, ILLINOIS.

METHOD OF MAKING NUTS FOR BOLTS.

1,223,604. Specification of Letters Patent. Patented Apr. 24, 1917.

Application filed June 21, 1916. Serial No. 104,911.

*To all whom it may concern:*

Be it known that I, JOHN W. MURRAY, a citizen of the United States, and resident of Joliet, in the county of Will and State of Illinois, have invented certain new and useful Improvements in Methods of Making Nuts for Bolts, of which the following is a specification.

My invention relates to nuts for bolts and has particular reference to a novel nut having chamfered corners and a spherical outer face.

In some situations it is desirable and in fact necessary to provide a nut, the inner corners of which shall be chamfered to permit of the nut being seated beneath a projection, as is common in some forms of splice bars for railroad rails. Furthermore it is common to employ lock washers with such nuts and difficulty has been experienced in so forming the nut that the face or surface which contacts the lock washer is flat and has a good bearing on the washer. By the process of manufacture it is difficult to fill out the inner face of the nut, the corners of which are chamfered the result being a nut which has an uneven and slightly convex surface.

By constructing the nut in the manner hereinafter described, I am enabled to obviate the difficulties referred to and at the same time effect a slight saving in the quantity of metal necessary in a nut having the same efficiency. The desired result is secured by so forming the dies which cut off and shape the nut that the outer face of the nut is convex or somewhat spherical in outline, the inner corners of the nut being chamfered. The same length of thread is thereby provided with a slight reduction in the quantity of metal employed, a nut being produced which has a flat inner face, the corners of the nut being chamfered and the outer face being somewhat spherical.

The invention will be more readily understood by reference to the accompanying drawings, wherein—

Figure 1 is a view showing the nut-forming dies commonly employed;
Fig. 2 is a view of a finished nut, such as contemplated by me;

Fig. 3 is a view through a railroad rail and splice bar showing the desirability for employing a chamfered nut having a flat inner surface, and Fig. 4 is a view showing a nut as has been heretofore commonly constructed due to the imperfections in manufacture.

In the drawings I have illustrated in Fig. 1 a portion of a nut-forming machine comprising a die box 10, within which one die member 11 is mounted. The other die member 12 has a concaved face, as indicated at 13, and serves to form the spherical outer face 14 of the nut 15, such as shown in Fig. 2. The desideratum is to construct a nut having a flat inner face, such as indicated at 16, and provided with chamfered corners 17. In the nuts heretofore constructed the chamfering of the corners by the provision of the projection 18 on the die 11 resulted in the formation of a nut having an inner face such as shown in Fig. 4. This did not provide a good bearing against the lock washers and was not acceptable to the users. By forming the die members 12 with a concave face the metal is caused to flow to all parts of the die members 11 and the result is a nut such as shown in Fig. 2. In the process of manufacture it will be understood that the bar of metal shown at 19 is fed up against the stop 20 and is cut off by the die member 12 and forced into the die box 10, whereupon a punch removes the center. After this operation the nut is threaded in a well-known manner.

The cause of the formation of the nut, such as shown in Fig. 4, is thought to be that the pressure of the dies is equally applied and as considerable resistance is offered by the lugs which cause the chamfering of the corners, the sides or adjacent edges of the nut are not filled out, it being difficult to apply sufficient pressure over the entire face of the nut to cause the metal to flow. By my improvement the pressure is unequally applied to the outer face of the nut, there being initially a greater pressure applied to the side edges. The result is that the metal flows along the side of the nut and fills up all the spaces in the female die. Theoretically this result might be secured in a nut having a flat outer face if the blank from which the nut was formed was provided with a slight excess of metal at the side edges. A flat-face die would, therefore, exert a greater pressure at the side of the blank than at other portions. The nut itself is, however, an improvement when constructed as shown in Fig. 2, for the reason that the same efficiency is present with a slight reduction in the weight thereof. The requirement as to the number of threads is met and the amount of metal is reduced to the extent of reduction due to the spherical or curved outer face. By reason of this construction, a blank or square of metal of slightly less size may be sheared off and a nut be produced which has the same efficiency as that of the nut heretofore constructed.

In the construction of Fig. 3 the rail 21 is braced by a splice bar 22 and held by a bolt 23, the nut of which is of my improved form. A lock washer 24 is disposed between the splice bar and the nut and bears against the flat face 16 of the nut. The rib 25 on the splice bar is so located because of the design as to require the chamfering of the inner corners of the nut as at 17. It will be seen from this figure the desirability of the nut such as herein described.

I claim:

1. The method of forming nuts for bolts, which consists in severing a block of metal from a bar, punching said block to form a bolt opening, then compressing said block into a die in such manner as to form a flat face bounded by chamfered corners, the compressive force being so applied in order to produce such result as to form a convex surface on the opposite face of the block, substantially as described.

2. The method of forming nuts for bolts, which consists in severing a block of metal from a bar, punching said block to form a bolt opening, then compressing said block into a die in such manner as to form a flat face bounded by chamfered corners, the compressive force being unequally applied whereby a greater deflection of metal is caused at the sides of the nut, the resultant product having a convex surface opposite said flat face.

Signed at Joliet, Illinois, this 13th day of June, 1916.

JOHN W. MURRAY.

Witnesses:
 THOMAS J. SAMPSON,
 WILBUR C. FRY, Jr.